United States Patent
Sekiguchi et al.

(10) Patent No.: US 8,325,786 B2
(45) Date of Patent: Dec. 4, 2012

(54) SEMICONDUCTOR DEVICE AND COMMUNICATION DEVICE

(75) Inventors: Katsumi Sekiguchi, Tokyo (JP); Mikihisa Orimo, Kodaira (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 467 days.

(21) Appl. No.: 12/620,783

(22) Filed: Nov. 18, 2009

(65) Prior Publication Data

US 2010/0124258 A1 May 20, 2010

(30) Foreign Application Priority Data

Nov. 20, 2008 (JP) ................................ 2008-296563

(51) Int. Cl.
*H04B 1/38* (2006.01)

(52) U.S. Cl. ........................................ 375/216; 375/340
(58) Field of Classification Search .................. 375/219, 375/340; 455/41.2, 558, 556.1, 557; 714/799; 370/276

See application file for complete search history.

(56) References Cited

U.S. PATENT DOCUMENTS

| 7,245,937 | B2 * | 7/2007 | Maari | 455/558 |
| 2003/0110512 | A1 * | 6/2003 | Maari | 725/131 |
| 2006/0131413 | A1 * | 6/2006 | Morita | 235/451 |
| 2009/0132898 | A1 * | 5/2009 | Nakamura et al. | 714/799 |
| 2010/0105324 | A1 * | 4/2010 | Takayama | 455/41.2 |
| 2010/0176202 | A1 * | 7/2010 | Teraoka et al. | 235/492 |

FOREIGN PATENT DOCUMENTS

JP  2002-342725 A  11/2002

* cited by examiner

*Primary Examiner* — Shuwang Liu
*Assistant Examiner* — Helene Tayong
(74) *Attorney, Agent, or Firm* — Miles & Stockbridge P.C.

(57) ABSTRACT

There is a need for reducing the scale of a circuit that determines and decodes code types for reception signals coded with different codes. A reception logic circuit determines and decodes code types for reception signals coded with different codes. The reception logic circuit determines one of code types for a demodulation signal corresponding to the reception signal based on a difference between codes detected during a modulation period or a non-modulation period occurring in the demodulation signal. The reception logic circuit decodes the code type in accordance with the determined code type based on the modulation period or the non-modulation period that alternately occurs in the demodulation signal. In this manner, the received data is reproduced. There is no need for a decoder specific to each code.

13 Claims, 15 Drawing Sheets

SEMICONDUCTOR DEVICE AND COMMUNICATION DEVICE

CROSS-REFERENCE TO RELATED APPLICATIONS

The disclosure of Japanese Patent Application No. 2008-296563 filed on Nov. 20, 2008 including the specification, drawings and abstract is incorporated herein by reference in its entirety.

BACKGROUND OF THE INVENTION

The present invention relates to a semiconductor device and a communication device for communication control. More specifically, the present invention relates to a technology that is appropriately applicable to IC cards and the other NFC (Near Field Communication) terminals designed for electromagnetic induction communication.

There are several currently available IC card systems having non-contact interfaces. Examples include ISO14443-A (type-A system) and ISO14443-B (type-B system) standardized by ISO, and the high-speed IC card system (referred to as high-speed type) standardized by Japan IC Card System Application Council (JICSAP).

During data transfer from a reader/writer to the IC card, for example, the type-A system pauses an RF (Radio Frequency) operating magnetic field and performs 100% ASK (amplitude shift keying) modulation. A Modified Miller code is used for modulated signals.

During data transfer from a reader/writer to the IC card, for example, the type-B system performs 10% ASK modulation on the RF operating magnetic field. An NRZ (Non Return to Zero) code is used for modulated signals.

During data transfer between a reader/writer and the IC card, for example, the high-speed type performs 10% ASK modulation on the RF operating magnetic field. A Manchester code is used for modulated signals.

For communication using multiple communication systems, a communication terminal such as the IC card has decoders compatible with the communication systems. The communication terminal such as the IC card uses a determination circuit to determine whether or not the decoders successfully decode data. A selection circuit needs to select an output from the decoder that successfully decodes data. Patent Document 1 describes an example of providing a reader/writer with multiple decoding circuits and selection circuits in accordance with communication systems.

Patent Document 1: Japanese patent laid-open No. 2002-342725

SUMMARY OF THE INVENTION

A proximity communication terminal such as a combination card may be compatible with multiple communication systems using multiple communication means corresponding to the communication systems. As a result, the circuit scale increases. This does not affect desktop reader/writers but may be a critical issue for portable devices such IC cards and portable communication terminals in consideration for miniaturization and weight saving. In terms of a reader/writer, Patent Document 1 describes determination of a communication system by measuring an interval between rising and trailing edges of a binarized signal. However, Patent Document 1 does not describe a specific determination method or application thereof to reproduction of received data. Patent Document 1 simply discloses an idea of time measurement for the type determination.

It is an object of the present invention to be capable of reducing the scale of a circuit that determines and decodes code types for reception signals coded with different codes.

These and other objects and novel features of the invention may be readily ascertained by referring to the following description and appended drawings.

The following summarizes representative aspects of the present invention disclosed in the specification.

A reception logic circuit determines and decodes code types for reception signals coded with different codes. The reception logic circuit determines one of code types for a demodulation signal corresponding to the reception signal based on a difference between codes detected during a modulation period or a non-modulation period occurring in the demodulation signal. The reception logic circuit decodes the code type in accordance with the determined code type based on the modulation period or the non-modulation period that alternately occurs in the demodulation signal. In this manner, the received data is reproduced. There is no need for a decoder specific to each code.

The following summarizes an effect resulting from the representative aspects of the present invention disclosed in the specification.

It is possible to reduce the scale of a circuit that determines and decodes code types for reception signals coded with different codes.

DETAILED DESCRIPTION OF THE PREFERRED EMBODIMENTS

1. Overview

Figure 1:
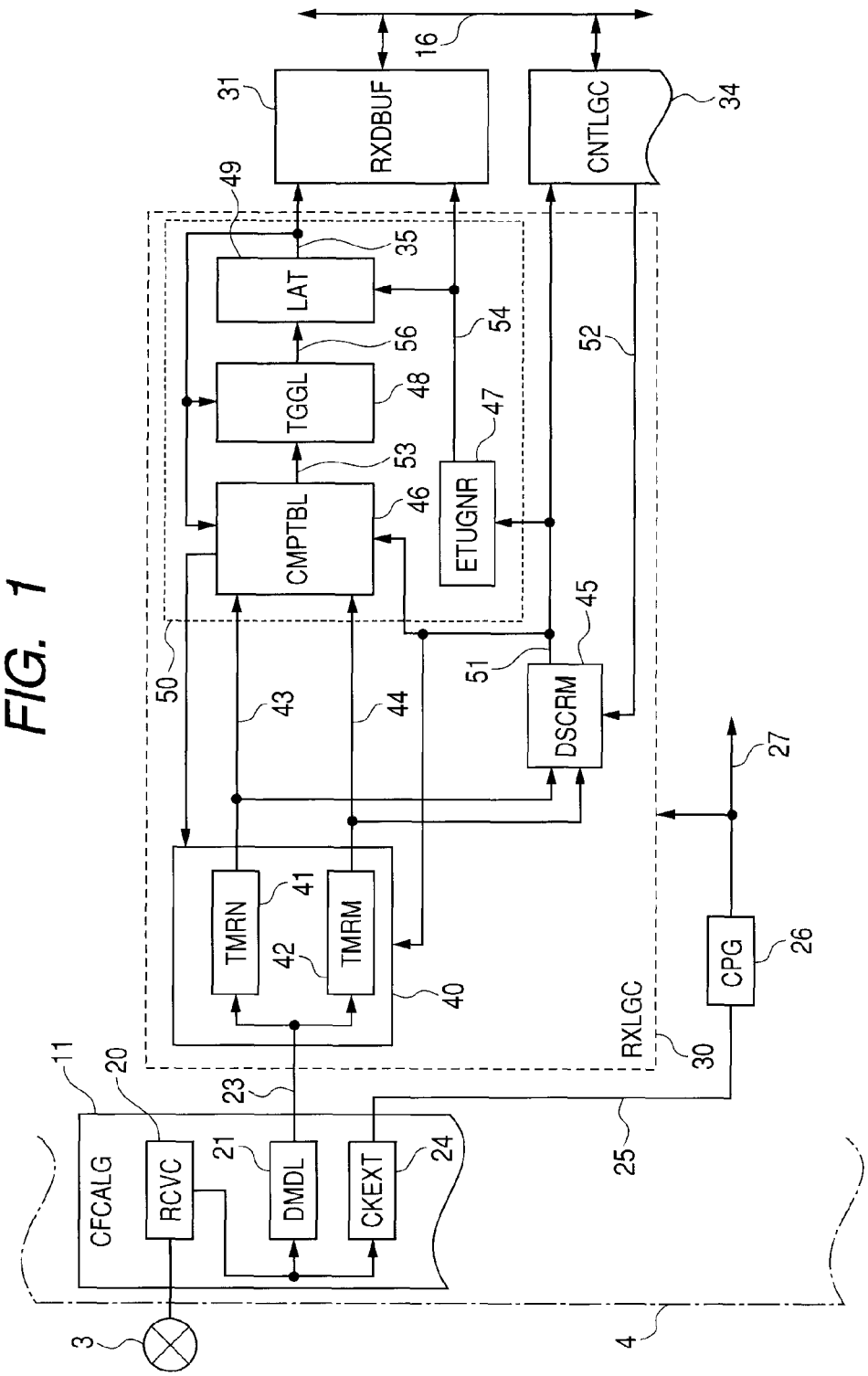
FIG. 1 is a block diagram exemplarily showing a reception logic circuit.

The following provides an overview about preferred embodiments of the invention disclosed in this specification. The overview contains parenthesized reference numerals with reference to the drawings. The reference numerals just show examples belonging to the concept of the components to which the reference numerals are assigned.

<1> A semiconductor device according to the invention comprises: a demodulation circuit for demodulating a modulated signal that is coded with a specified code type and is received at an antenna; and a reception logic circuit for decoding a demodulation signal that is output from the demodulation circuit. The reception logic circuit determines one of multiple code types for the demodulation signal and decodes the demodulation signal in accordance with a determined code type to reproduce reception data. The code type is determined based on a difference between codes appearing in a demodulation signal during one of a modulation period and a non-modulation period. The demodulation signal is decoded in accordance with a determined code type based on a state of one of a modulation period and a non-modulation period alternately appearing in the demodulation signal.

The above-mentioned reception logic circuit does not need a decoder specific to each code type. It is possible to reduce the scale of the circuit for determining and decoding code types of reception signals that are coded with different code types.

<2> In the semiconductor device according to item 1, the reception logic circuit comprises: a timer that measures one of a modulation period and a non-modulation period appearing in a demodulation signal; a determination section that determines a code type based on a measurement value measured by the timer; and a decode section that uses a result measured by the timer in accordance with a determined code type, decodes the demodulation signal, and reproduces reception data. It is possible to determine and decode a code type based on a measurement result from the timer.

<3> In the semiconductor device according to item 2, the timer measures a period by counting a clock signal synchronized with a carrier clock signal extracted from a modulated signal. This is convenient when a carrier clock can be extracted from a reception signal.

<4> In the semiconductor device according to item 2, the code types mainly comprise Modified Miller, NRZ, and Manchester codes.

<5> In the semiconductor device according to item 4, the determination section determines an NRZ code when the timer detects an excess of a measurement value for the non-modulation period over a value equivalent to half an encode time unit for each of Modified Miller and NRZ codes during a modulation period in a demodulation signal. The determination section determines a Modified Miller code when a demodulation signal enters a non-modulation period before excess over the value equivalent to half the encode time unit and a measurement value for the non-modulation period is detected to exceed the value equivalent to half the encode time unit during the non-modulation period. The determination section determines a Manchester code when a demodulation signal reenters a modulation period before a measurement value for the non-modulation period exceeds the value equivalent to half the encode time unit. It is possible to easily determine the Modified Miller, NRZ, and Manchester codes.

<6> In the semiconductor device according to item 5, the Manchester code comprises multiple code types corresponding to different data transmission rates. When determining the Manchester code, the determination section determines a transmission rate difference in the Manchester code in accordance with an increase in a measurement value for a modulation period. It is possible to determine Manchester codes having different transmission rates.

<7> In the semiconductor device according to item 5, the timer measures each non-modulation period when a Modified Miller code is determined as a code type. When a Modified Miller code is determined as a code type, the decode section reverses a logical value at each excess of a timer measurement value over a threshold value and synchronizes a reverse timing with the encode time unit to generate a decode signal. The Modified Miller code can be easily decoded.

<8> In the semiconductor device according to item 7, the threshold value is equivalent to a period exceeding half the encode time unit. It is possible to reduce possibilities of a decoding error due to an effect of duty variations in a demodulation signal waveform during the encode time unit.

<9> In the semiconductor device according to item 5, when an NRZ is determined as a code type, the timer repeatedly measures a period equivalent to 1/n of an encode time unit from initiation of a non-modulation period and measures a period equivalent to 1/n of an encode time unit from initiation of a modulation period. When an NRZ code is determined as a code type, the decode section reverses a logical value at each excess of the timer measurement value over a threshold value and synchronizes a reverse timing with the encode time unit to generate a decode signal. The NRZ code can be easily decoded.

<10> In the semiconductor device according to item 9, the threshold value is equivalent to a period half the encode time unit. It is possible to reduce possibilities of a decoding error due to an effect of duty variations in a demodulation signal waveform.

<11> In the semiconductor device according to item 5, when a Manchester code is determined as a code type, the timer measures a period overlapping with a non-modulation period and a period overlapping with a modulation period for each specified period before and after a boundary for an encode time unit. When a Manchester code is determined as a code type, the decode section reverses a logical value at each excess of the timer measurement value over a threshold value and synchronizes a reverse timing with the encode time unit to generate a decode signal. The Manchester code can be easily decoded.

<12> In the semiconductor device according to item 11, the specified period before and after a boundary for an encode time unit comprises a period equivalent to a quarter of an encode time unit before and after the same. It is possible to reduce possibilities of a decoding error due to an effect of duty variations in a demodulation signal waveform.

<13> The semiconductor device according to item 1 further comprises: a reception data buffer that temporarily stores reception data output from the reception logic circuit; a transmission data buffer that temporarily stores transmission data; a transmission logic circuit that encodes transmission data output from the transmission data buffer in accordance with a code type determined by the reception logic circuit; a modulation circuit that modulates a carrier into a data signal based on an encoding signal generated by the transmission logic circuit; and a central processing unit that controls operations of the reception logic circuit and the transmission logic circuit and provides access control for the reception data buffer and the transmission data buffer. The semiconductor device can be configured as a microcontroller or a microcomputer.

<14> A communication device according to the invention performs communication based on electromagnetic induction using a carrier and includes a data processing device. The data processing device comprises: a demodulation circuit for demodulating a modulated signal that is coded with a specified code type and is received at an antenna; and a reception logic circuit for decoding a demodulation signal that is output from the demodulation circuit. The reception logic circuit determines one of multiple code types for the demodulation signal and decodes the demodulation signal in accordance with a determined code type to reproduce reception data. The code type is determined based on a difference between codes appearing in a demodulation signal during one of a modulation period and a non-modulation period. The demodulation signal is decoded in accordance with a determined code type based on a state of one of a modulation period and a non-modulation period alternately appearing in the demodulation signal.

The reception logic circuit does not require a decoder specific to each code. It is possible to reduce the scale of the circuit for determining and decoding code types of reception signals that are coded with different code types. Consequently, the communication device can be miniaturized.

<15> In the semiconductor device according to item 14, the reception logic circuit comprises: a timer that measures one of a modulation period and a non-modulation period appearing in a demodulation signal; a determination section that determines a code type based on a measurement value measured by the timer; and a decode section that decodes the demodulation signal in accordance with a determined code type and reproduces reception data. It is possible to determine and decode a code type based on a measurement result from the timer.

2. Details of the Embodiments

The following describes the embodiments in more detail.

Figure 2:
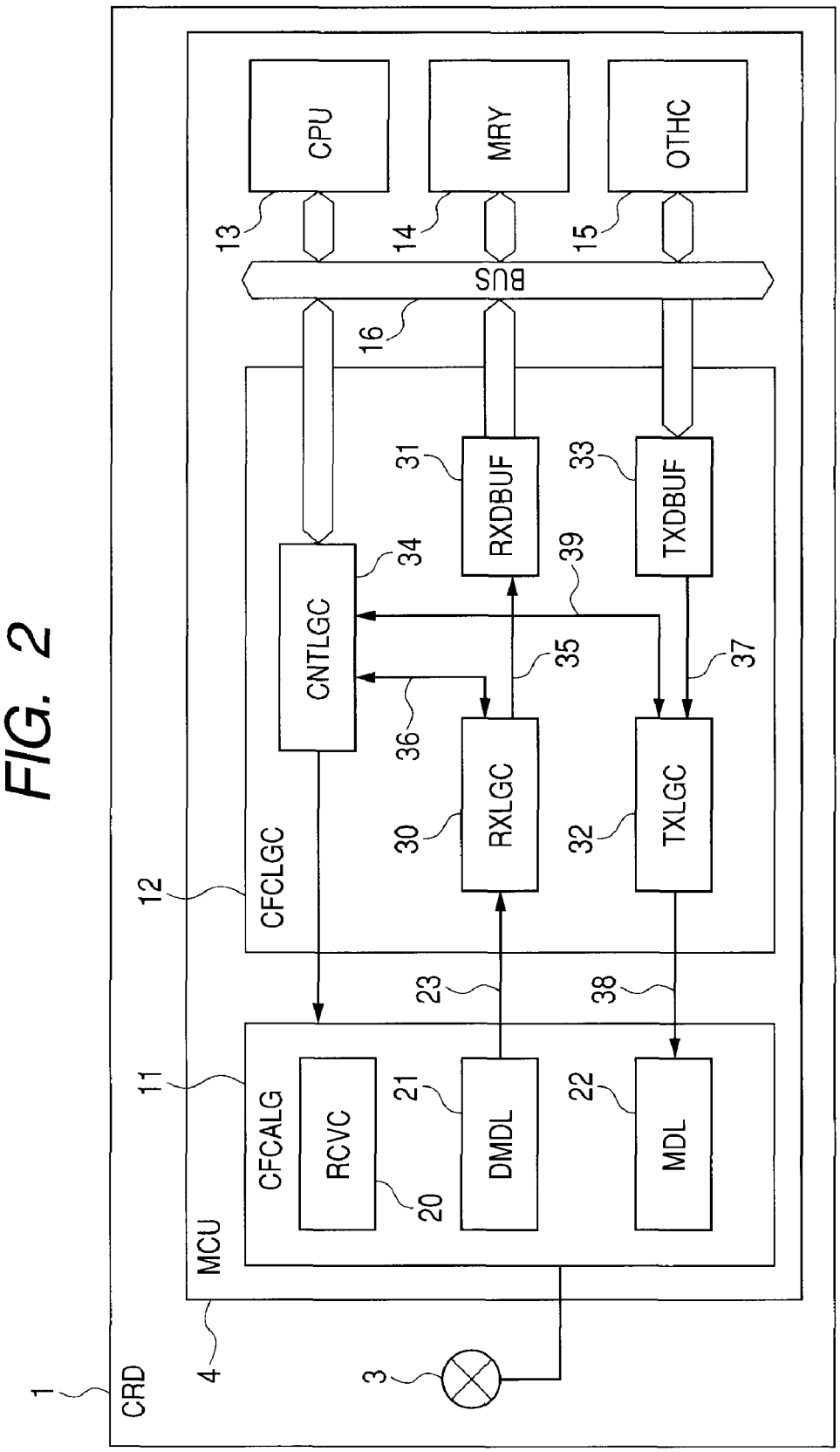
FIG. 2 is a block diagram exemplarily showing a non-contact IC card as an example of the communication device according to the invention.

FIG. 2 shows a non-contact IC card as an example of the communication device according to the invention. The reference numeral 1 represents a non-contact IC card (CRD). The non-contact IC card 1 is provided with an antenna 3 and a microcomputer (MCU) 4 for the IC card on a card substrate. The microcomputer 4 is an example of the semiconductor device according to the invention. The microcomputer 4 is formed on a single semiconductor substrate made of single-crystalline silicon using a complementary MOS integrated-circuit manufacturing technology, for example. The microcomputer 4 includes a non-contact communication analog section (CFCALG) 11, a non-contact communication logic section (CFCLGC) 12, a central processing unit (CPU) 13, memory (MRY) 14 such as RAM, the other circuit (OTHC) 15 containing a timer and nonvolatile memory, and a bus (BUS) 16.

The non-contact communication analog section 11 includes a reception circuit (RCVC) 20, a demodulation circuit (DMDL) 21, and a modulation circuit (MDL) 22.

The non-contact communication logic section 12 includes a reception logic circuit (RXLGC) 30, a reception data buffer (RXDBUF) 31, a transmission logic circuit (TXLGC) 32, a transmission data buffer (TXDBUF) 33, and a control logic section (CNTLGC) 34.

The antenna 3 provides a closed loop coil. A change in an electric current flowing through the coil allows the antenna 3 to generate an electromagnetic wave. A change in a magnetic flux passing through the coil as the antenna 3 applies an electric current to the antenna 3.

The reception circuit 20 receives a current flowing through the antenna 3. The reception circuit 20 synchronizes, detects, and outputs the current to the demodulation circuit 21. The demodulation circuit 21 demodulates a demodulation signal 23 supplied from the reception circuit 20 and supplies the signal to the reception logic circuit 30. The reception logic circuit 30 determines a code type of the demodulation signal 23 supplied from the demodulation circuit 21. The reception logic circuit 30 decodes the demodulation signal 23 in accordance with the determined code type. The reception logic circuit 30 supplies the reception data buffer 31 with reception data 35 resulting from the decoding. The determined code type is supplied to the control logic section 34. The reference numeral 36 generically represents a signal that is input and output between the reception logic circuit 30 and the control logic section 34. The CPU 13 transfers reception data stored in the reception data buffer 31 to the memory 14. The CPU 13 sequentially processes data based on the data. When data needs to be transmitted to the other devices such as a reader/writer, the CPU 13 transfers such data to the transmission data buffer 33 from the memory 14 via the bus 16.

The transmission logic circuit 32 receives information about the determined code type from the control logic section 34. When the transmission data buffer 33 outputs transmission data 37, the transmission logic circuit 32 encodes that data in accordance with the code type. The transmission logic circuit 32 then supplies a modulation control signal 38 to the modulation circuit 22. The reference numeral 39 generically represents a signal that is input and output between the transmission logic circuit 32 and the control logic section 34. The modulation circuit 22 varies an impedance of the coil as the antenna 3 viewed from outside in accordance with the modulation control signal 38 received from the transmission logic circuit 32. The reader/writer outputs an electromagnetic wave as a carrier to generate a magnetic field due to a high-frequency wave around the antenna 3. The magnetic field around the antenna 3 varies as the impedance of the coil as the antenna 3 varies. The carrier as an electromagnetic wave output from the reader/writer is modulated in accordance with the modulation control signal 38. Data supplied from the CPU 13 to the transmission data buffer 33 is transmitted to the reader/writer that outputs electromagnetic waves. Transmission rate information is contained in the determined code type information received from the control logic 34. Based on the transmission rate information, it is possible to control the transmission rate of a signal transmitted from the antenna 3. A device called an initiator is used for proximity communication based on the electromagnetic induction so as to initially output an electromagnetic wave and start the communication. The initiator transmits a command to a communication destination referred to as a target. The communication destination returns a response to the command to establish the proximity communication. As a communication destination, the target returns a response to the command from the initiator. The embodiment provides an example where the reader/writer works as an initiator and the IC card works as a target.

Figure 3:
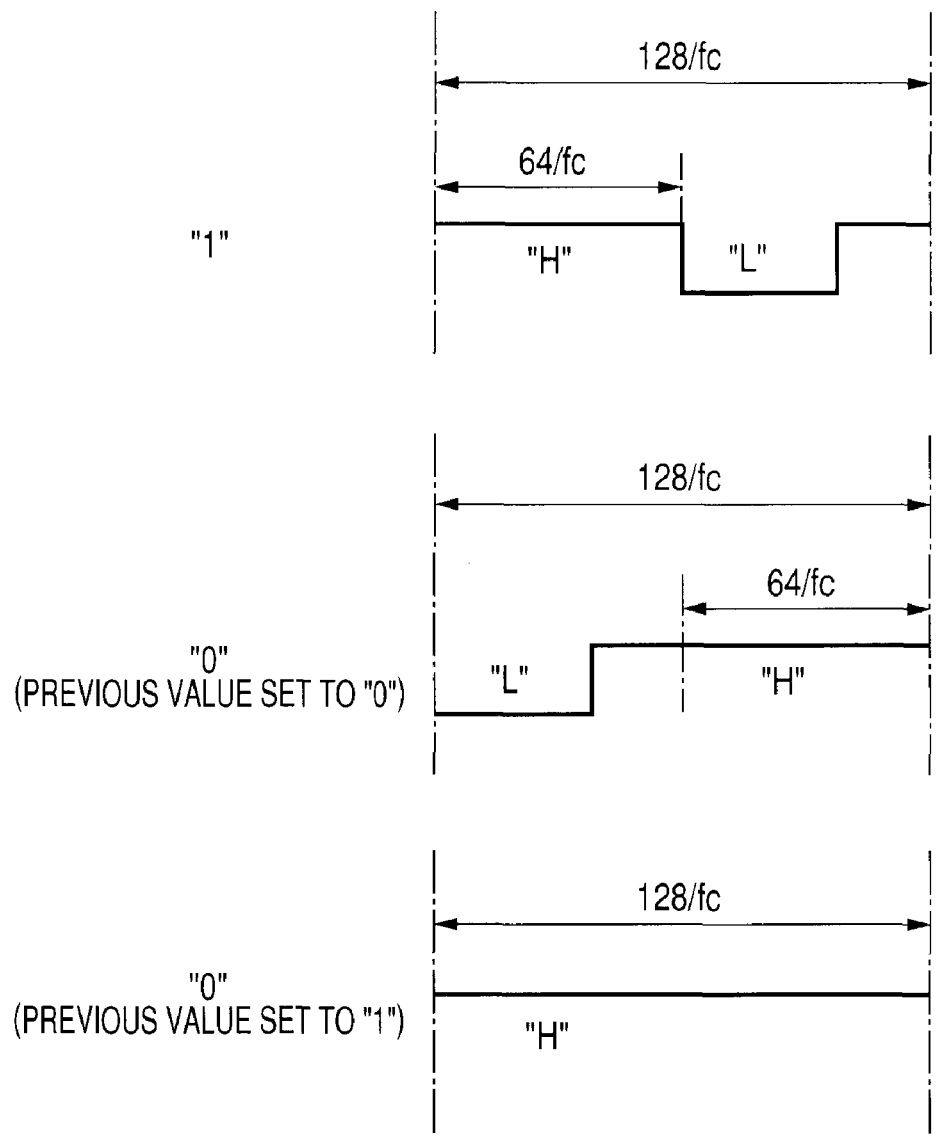
FIG. 3 is an explanatory diagram exemplarily showing a type-A modulation code.
Figure 4:
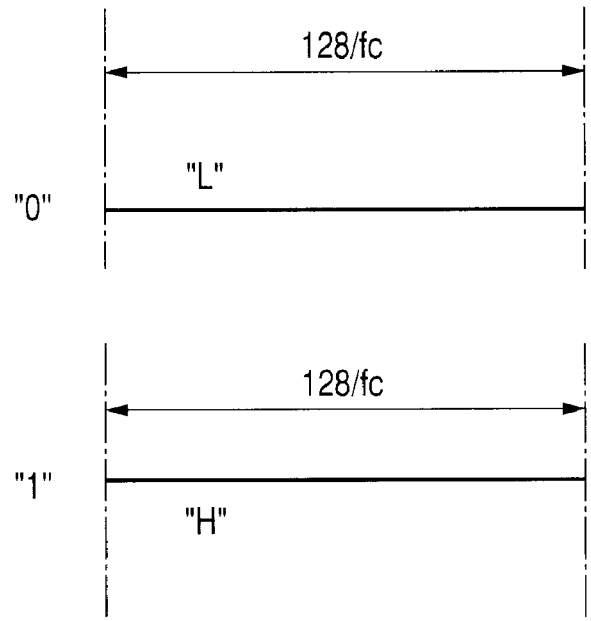
FIG. 4 is an explanatory diagram exemplarily showing a type-B modulation code.
Figure 5:
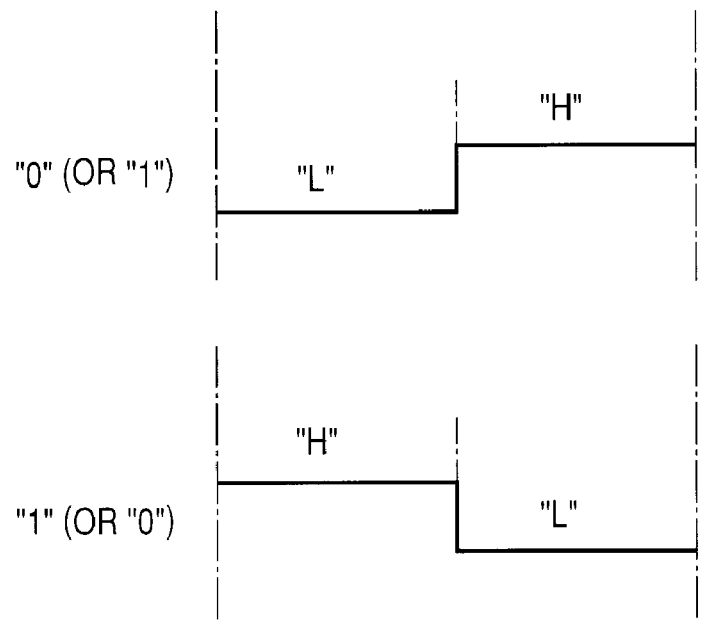
FIG. 5 is an explanatory diagram exemplarily showing a high-speed type modulation code.

The IC card 1 uses the above-mentioned type A, type B, and high-speed type as transmission code specifications. The type A encodes data using Modified Miller as the code type during data transmission from the reader/writer to the IC card. The type A encodes data using Manchester as the code type during data transmission from the IC card to the reader/writer. The type B encodes data using NRZ as the code type during data transmission from the reader/writer to the IC card. The type B encodes data using NRZ-L (Non Return to Zero-Level) as the code type during data transmission from the IC card to the reader/writer. The type A or B uses 106 kbps (kilobits per second), 212 kbps, 424 kbps, or 847 kbps as a data transmission rate. The type B uses 106 kbps as the data transmission rate. The type A and the type B use 106 kbps for initial communication between the reader/writer and the IC card. The high-speed type uses Manchester as the code type for encoding during data transmission between the reader/writer and the IC card. The high-speed type selects 212 kbps, 424 kbps, or 847 kbps as the data transmission rate. The selected transmission rate is used for the communication from the beginning. FIG. 3 exemplarily shows a modulation code for the type A. FIG. 4 exemplarily shows a modulation code for the type B. FIG. 5 exemplarily shows a modulation code for the high-speed type. FIGS. 3 and 4 each show a 128-pulse period for the carrier equivalent to one etu (encode time unit) using the transmission rate of 106 kbps. In the drawings, the "H" period corresponds to a non-modulation period. The "L" period corresponds to a modulation period.

The reception logic circuit 30 determines whether the demodulation signal 23 demodulated in the demodulation circuit 21 uses the type A, the type B, or the high-speed type as the code type. The reception logic circuit 30 decodes the demodulation signal 23 in accordance with a determination result. The reception logic circuit 30 uses a signal 36 to supply the control logic section 34 with the determination result which includes a code type. The control logic section 34 uses a signal 39 to supply the transmission logic circuit 32 with the determination result. The transmission logic circuit 32 encodes the transmission data 37 using the specified code type to generate the modulation control signal 38. The following describes in detail the configuration of the reception logic circuit 30 for code determination and decoding.

FIG. 1 shows an example of the reception logic circuit 30.

A clock extraction circuit (CKEXT) 24 is included in the non-contact communication analog section 11 and generates a carrier extraction clock signal 25 from the carrier in response to output from the reception circuit 20. Based on the carrier extraction clock signal 25, a clock pulse generator (CPG) 26 generates an operation clock signal 27 equivalent to the carrier frequency. The operation clock signal 27 is used as an operation reference clock for the reception logic circuit 30 and the other circuits. The carrier extraction clock signal 25 has the frequency of 13.56 MHz, for example.

The reception logic circuit 30 includes a timer 40, a determination section (determination circuit) 45, and a decode section 50. The timer 40 measures a modulation period or a non-modulation period appearing in the demodulation signal 23. The determination section (determination circuit) 45 determines the code type of the demodulation signal 23 based on a value measured by the timer 40. The decode section 50 demodulates the demodulation signal 23 using a result measured by the timer in accordance with the determined code type and reproduces the reception data. The code type determination result from the determination section 45 just corresponds to the type A, the type B, or the high-speed type as the transmission code specification for the active electromagnetic wave communication and indicates which communication system is to be used. In the present specification, the code type determination result from the determination section 45 is equivalent to a communication system determination result and a transmission rate determination result. The above-mentioned communication is performed as packet communication using a specified format. The determination section 45 checks the beginning preamble to determine the code type. When the communication is inactive, the control logic section 34 uses a signal 52 to initialize the determination section 45. A signal 51 is also initialized accordingly. In this manner, the timer 40 is provided with an operation mode for determining the code type and starts determining the code type in response to input of the modulated signal 23. The preamble is followed by a synch code and a data section. The timer 40 and the decode section 50 receive the signal 51 concerning results of the code type determination for the sync code and the data section from the determination section 45. The timer 40 and the decode section 50 accordingly perform a timer operation and a decode operation to decode the corresponding demodulation signal.

The timer 40 includes a non-modulation period measuring timer (TMRN) 41 and a modulation period measuring timer (TMRM) 42, for example. The non-modulation period measuring timer (TMRN) 41 measures a non-modulation period in the demodulation signal 23 in accordance with an operation mode indicated by the signal 51. The signal 51 indicates the operation mode such as a code type determination operation mode, a first timer operation mode corresponding to the type-A communication system, a second timer operation mode corresponding to the type-B communication system, or a third timer operation mode corresponding to the high-speed type communication system. The modulation period measuring timer (TMRM) 42 measures a modulation period in the demodulation signal 23 in accordance with an operation mode indicated by the signal 51. The signal 51 indicates the operation mode such as the code type determination operation mode, the first timer operation mode corresponding to the type-A communication system, the second timer operation mode corresponding to the type-B communication system, or the third timer operation mode corresponding to the high-speed type communication system.

The decode section 50 includes a timer value comparison circuit (CMPTBL) 46, a toggle circuit (TGGL) 48, a latch circuit (LAT) 49, and an etu clock generation circuit (ETUGNR) 47. The timer value comparison circuit 46 compares measurement values 43 and 44 from the measuring timers 41 and 42 with a threshold value selected based on the determination signal 51 from the determination section 45. The timer value comparison circuit 46 outputs a control signal 53 corresponding to a comparison result to the toggle circuit 48. The determination result indicated by the signal 51 and immediately preceding bit (previous bit) fed back from the latch circuit 49 determine which of the measurement values 43 and 44 is to be used for the determination or which threshold value is to be used for the comparison. The latch circuit 49 latches and outputs a value (immediately preceding bit value). The toggle circuit 48 is fed back with the output value as a signal 35. The toggle circuit 48 selectively reverses the input value and outputs it to the latch circuit 49. The selective reversal occurs when the control signal 53 changes. The latch timing of the latch circuit 49 corresponds to every cycle of an etu clock signal 54. An etu clock generation circuit 47 outputs the etu clock signal based on the determination result supplied from the signal 51. The cycle of the etu clock signal is equivalent to one bit of reception data and differs from one of the communication systems to another.

The following describes operations for determining the code types or the communication systems.

An SOC indicates the beginning of a communication frame according to the type-A communication system. An SOF indicates the beginning of a communication frame according to the type-B communication system. A preamble indicates the beginning of a communication frame according to the high-speed type communication system. An initial communication frame contains "0" for each of the SOC, SOF, and preamble. To determine the communication system, the determination section 45 checks the measurement values 43 and 44 and recognizes the characteristic of the signal "0"

transmitted from the reader/writer. Communication frame structures of the communication systems are described in ISO14443-A, ISO14443-B, and the high-speed IC card system standardized by Japan IC Card System Application Council (JICSAP).

Figure 6:
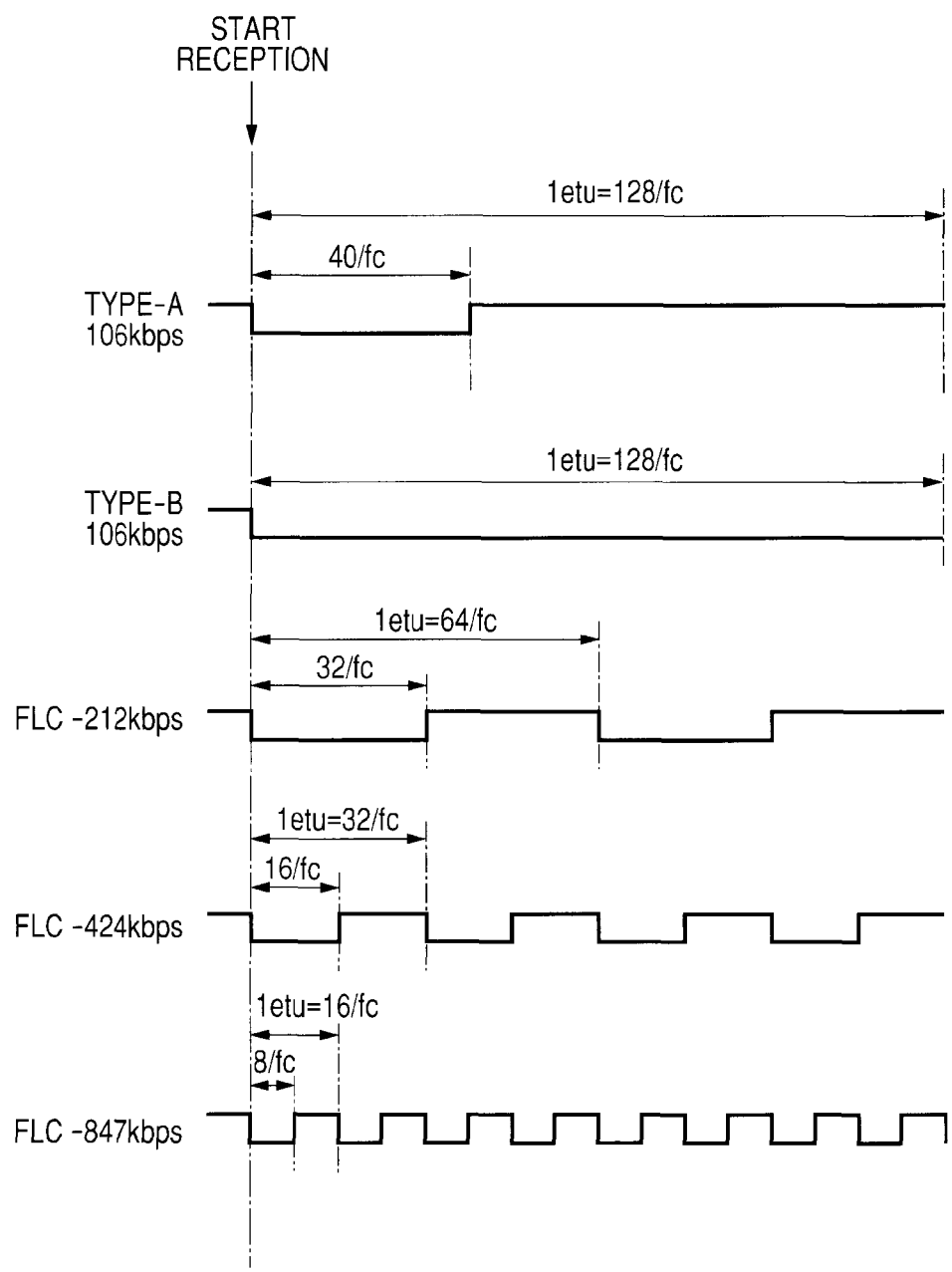
FIG. 6 is a waveform diagram showing a demodulation signal waveform at initiation of packet reception.

FIG. 6 shows a demodulation signal waveform when the packet reception starts. One bit is shown for TYPE-A (type-A communication system) and TYPE-B (type-B communication system). Two bits are shown for FLC-212 kbps (212 kbps high-speed type communication system). Four bits are shown for FLC-424 kbps (424 kbps high-speed type communication system). Eight bits are shown for FLC-847 kbps (847 kbps high-speed type communication system). All the communication systems initially receive data "0s".

Figure 7:
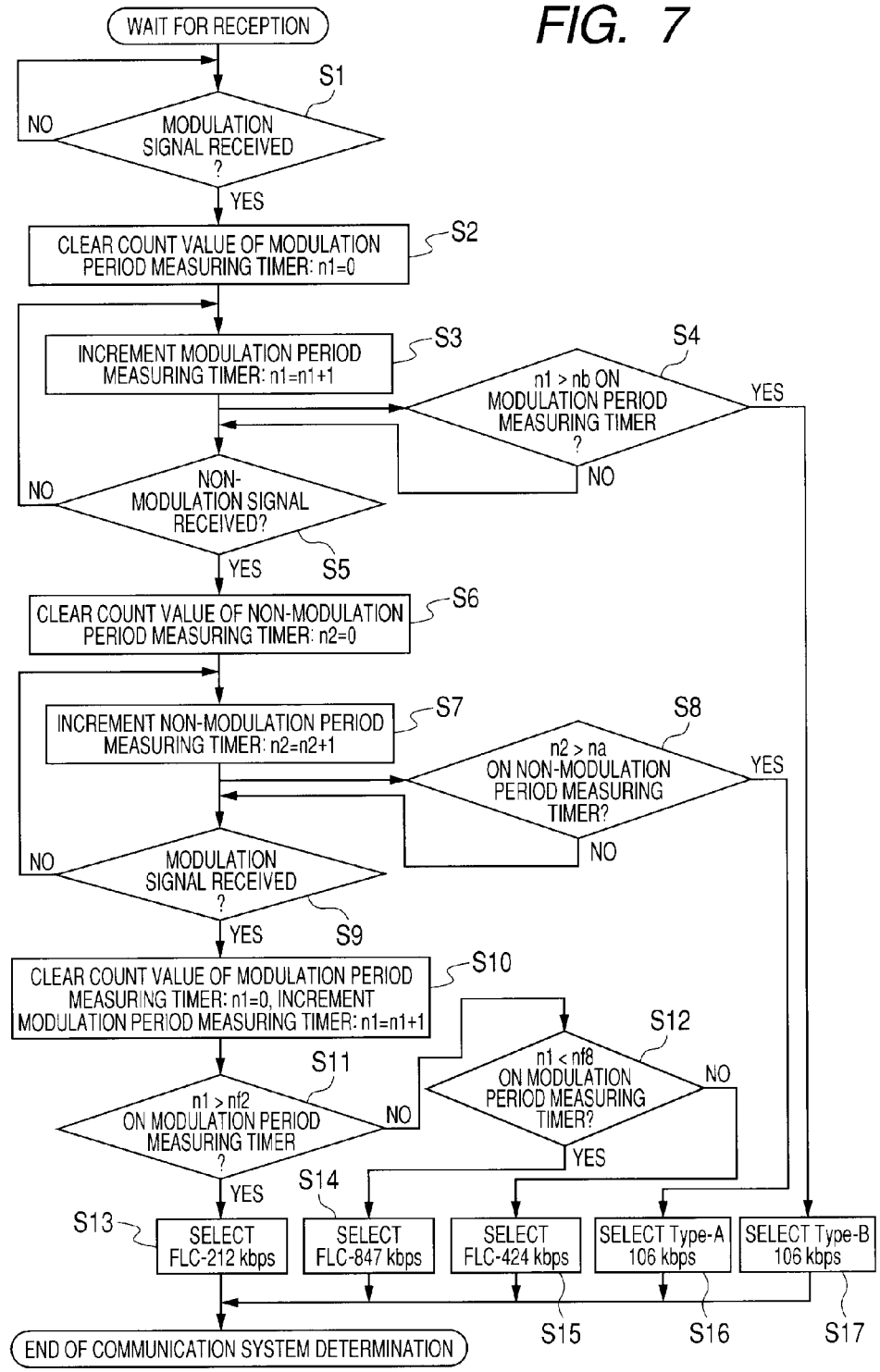
FIG. 7 is a flowchart showing a code type determination operation, i.e., a communication system determination operation.

FIG. 7 exemplarily shows a flowchart showing a code type determination operation, i.e., a communication system determination operation. The determination operation starts when a demodulation signal set to "L" is received in a reception wait state (S1). The operation zeros a counter value n1 of the modulation period measuring timer when the "L" demodulation signal 23 is received (S2). The operation increments the modulation period measuring timer while receiving the modulation portion ("L") of the demodulation signal 23 (S3). A counter clock (fc) to be counted is assumed to be the operation clock signal 27 that is generated from the clock generation circuit 26 such as a PLL circuit for inputting the carrier extraction clock signal (13.56 MHz) 25. The frequency of the operation clock signal 27 is equal to the frequency of 13.56 MHz of the carrier extraction clock signal 25 but is not limited thereto. The modulation period measuring timer 42 compares the counter value n1 with a value nb that is assumed to be 64. At step S4, the operation determines whether or not n1>nb=64. The condition n1>nb=64, when satisfied, makes it possible to determine that the communication system is TYPE-B (106 kbps), i.e., that the code type is NRZ (S17). This is because the communication system is limited to TYPE-B (106 kbps) when the first bit of reception data indicates the modulation period longer than or equal to 64/fc.

When the condition n1>nb=64 is not satisfied at step S4, the operation may receive the non-modulation portion ("H") in the demodulation signal 23 (S5). Upon reception of the non-modulation portion, the operation zeros the counter value n2 of the non-modulation period measuring timer 41 (S6). The operation then increments the non-modulation period measuring timer 41 while receiving the non-modulation portion of the demodulation signal 23 (S7). Similarly, the counter clock fc is assumed to be the operation clock signal 27 that is generated from the clock generation circuit 26 based on the carrier extraction clock signal (13.56 MHz) 25. The non-modulation period measuring timer 41 compares the counter value n2 with a value na that is assumed to be 64. At step S8, the operation determines whether or not the condition n2>na=64 is satisfied. The condition n2>na=64, when satisfied, makes it possible to determine that the communication system is TYPE-A (106 kbps), i.e., that the code type is Modified Miller (S16). This is because the communication system is limited to TYPE-A (106 kbps) when the first bit of reception data indicates the non-modulation period longer than or equal to 64/fc. The value of na or nb is not limited to 64 because some margin is provided. Since TYPE-A ensures 100% modulation, no clock is normally extracted from a carrier during the modulation period. When the clock generation circuit 45 such as a PLL circuit does not complement the modulation period with a clock, the operation may omit steps S1 to S4 and start from step S5.

When the condition n2>na=64 is not satisfied at step S8, the operation may re-receive the modulation portion ("H") of the demodulation signal 23 (S9). Upon reception of the modulation portion, the operation zeros the counter value n1 of the modulation period measuring timer 42. The operation then increments the modulation period measuring timer 42 while receiving the modulation portion of the demodulation signal 23 (S10). The operation determines whether or not the condition of the counter value n1>nf2=24 is satisfied, where nf2=24 is 1.5 times the modulation period "L" at 424 kbps (S11). When the condition is satisfied, the communication system may be assumed to be FLC-212 kbps (S13). Otherwise, the operation determines whether or not the condition of n1>nf8=12 is satisfied, where nf8=12 is 0.75 times the modulation period "L" at 424 kbps (S12). When the condition is satisfied, the communication system may be assumed to be FLC-847 kbps (S14). Otherwise, the communication system may be assumed to be FLC-424 kbps (S15). The FLC high-speed type communication fills the first 48 bits of data with successive "0s" as logical values. The determination precision may be improved by returning to step S5 to repeat the operation. Though not shown in the drawing, the operation may zero the counter value n1 of the modulation period measuring timer 42 when receiving the modulation portion at step S9. The operation may maintain the non-modulation period measuring timer value measured at step S7. The operation may compare the maintained non-modulation period measuring timer value with the appropriately settled threshold value nf2. When n2>nf2 is satisfied, the communication system may be assumed to be FLC-212 kbps. Otherwise, the operation may compare the maintained timer value 2 with the appropriately settled threshold value nf8. When n2<nf8 is satisfied, the communication system may be assumed to be FLC-847. When the condition is not satisfied, the communication system may be assumed to be FLC-424 kbps. This method can simplify the determination flow without the need for step S11 as the measurement operation.

The following describes decode operations corresponding to the communication system determination results.

Figure 8:
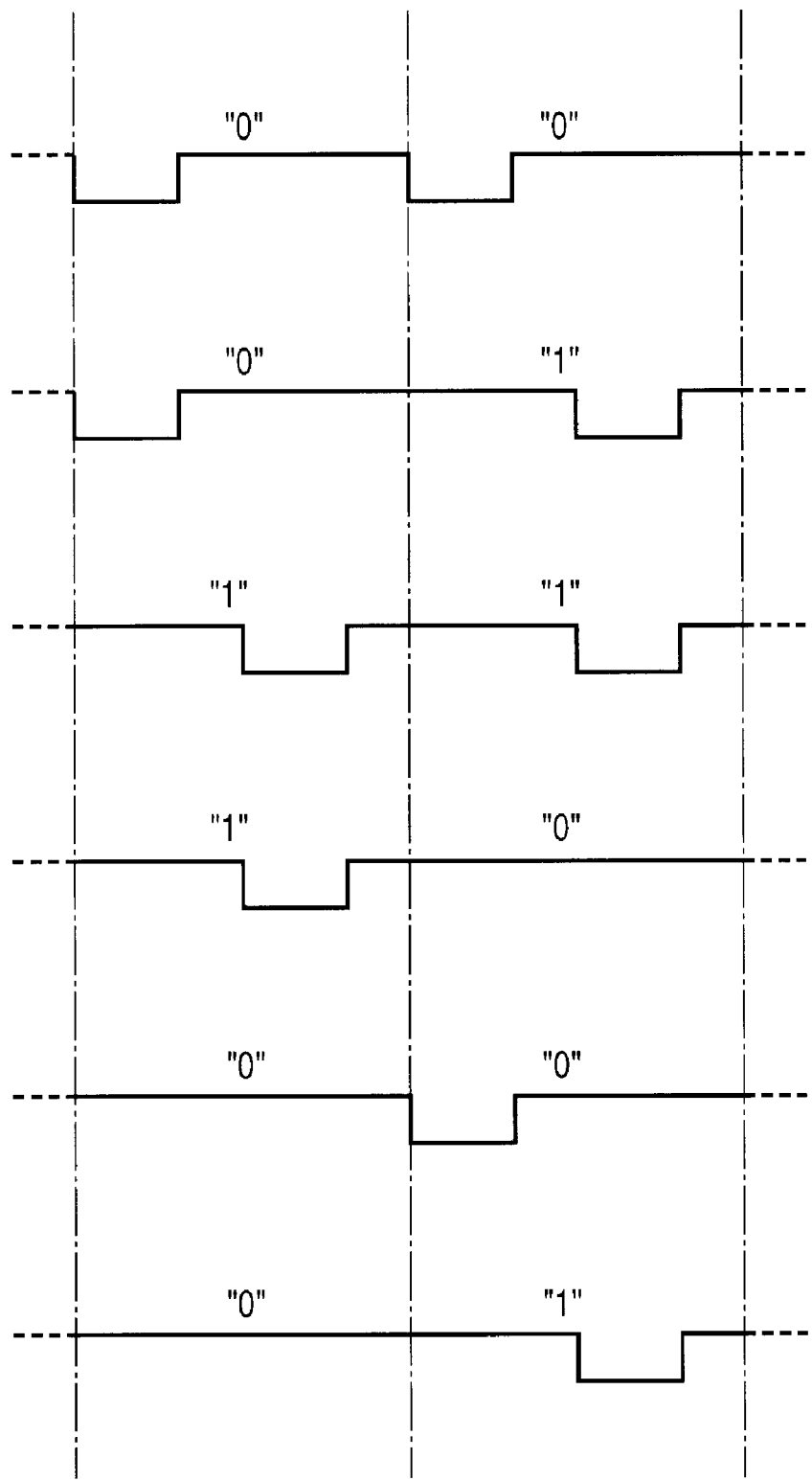
FIG. 8 is a waveform diagram showing a 2-bit signal coded with the type-A modulation code.
Figure 9:
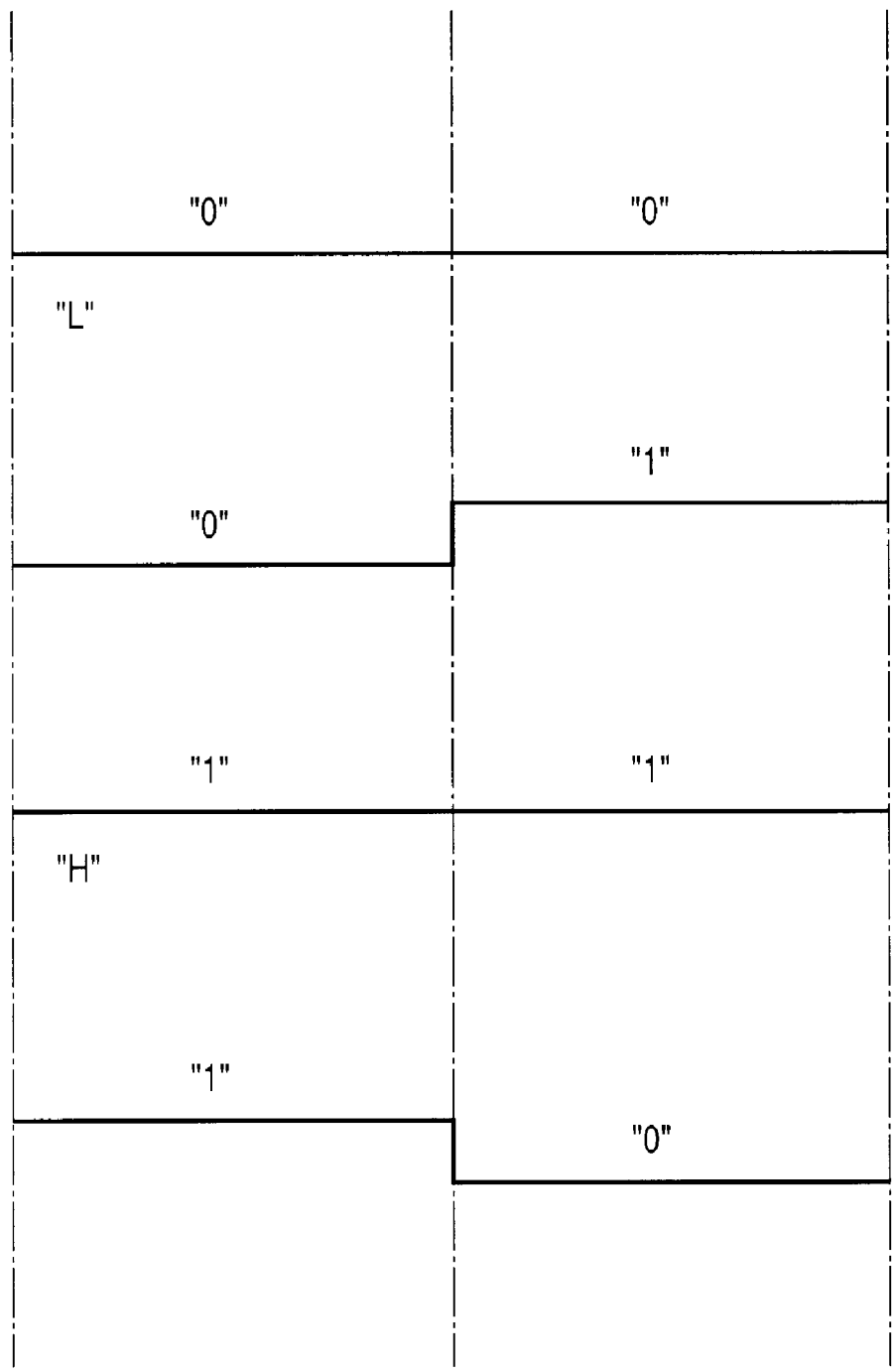
FIG. 9 is a waveform diagram showing a 2-bit signal coded with the type-B modulation code.
Figure 10:
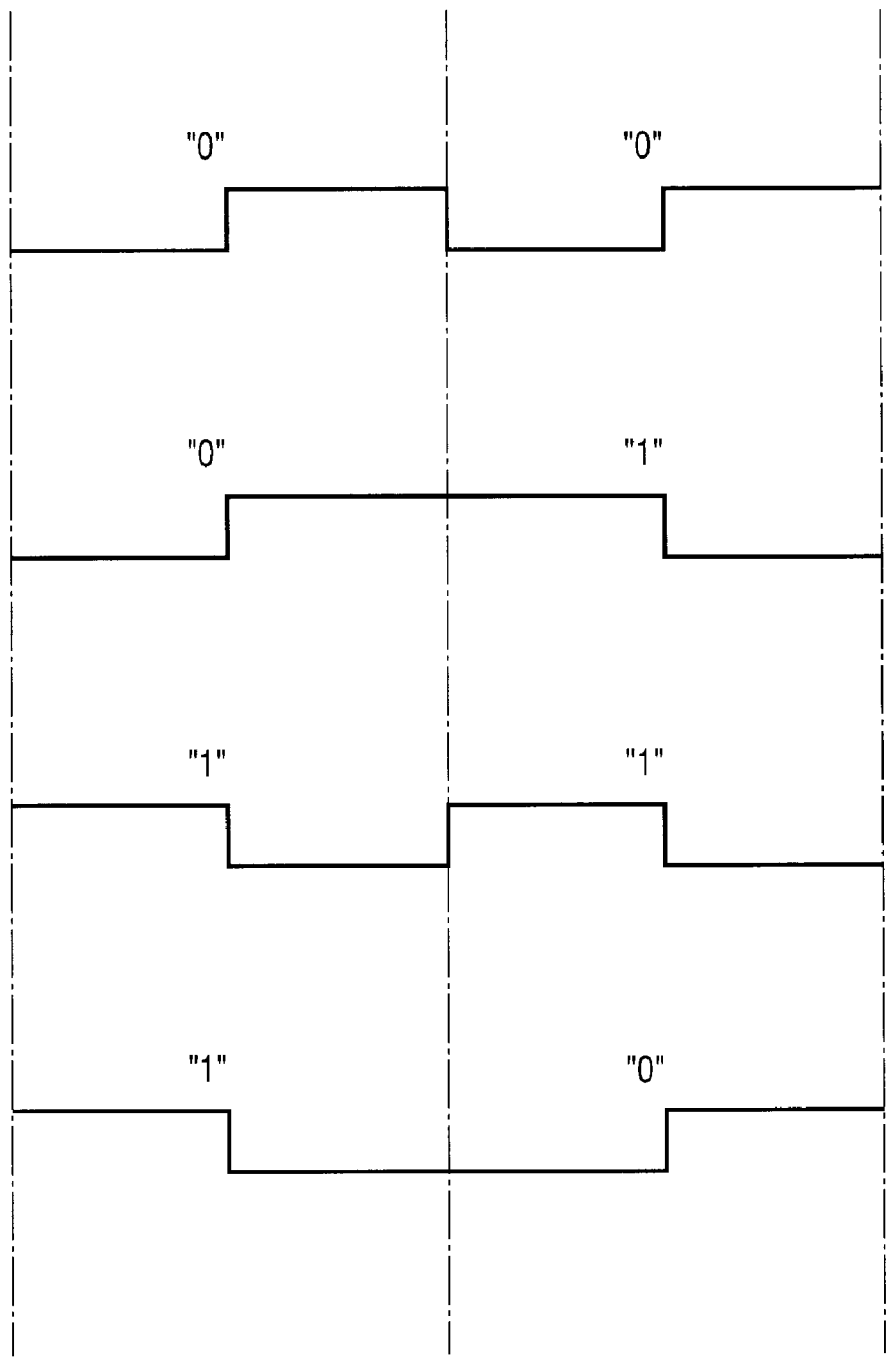
FIG. 10 is a waveform diagram showing a 2-bit signal coded with an FLC modulation code.

FIG. 8 shows a 2-bit signal coded with the modulation code according to the type-A system. FIG. 9 shows a 2-bit signal coded with the modulation code according to the type-B system. FIG. 10 shows a 2-bit signal coded with the modulation code according to the type-FLC system.

According to the type-A system, a change in data from "0" to "1" or from "1" to "0" causes the non-modulation period ("H" period) to be longer than that for the unchanged data "0" or "1".

According to the type-B system, the modulation changes to the demodulation or vice versa when data changes from "0" to "1" or vice versa. The modulation or demodulation remains unchanged when data remains "0" or "1".

According to the FLC system, a change in data from "0" to "1" or from "1" to "0" causes the modulation period or the non-modulation period to be longer than that for the unchanged data "0" or "1".

The type-A system, the type-B system, and the FLC system each initially receive data "0" from the reader/writer.

When decoding a reception signal, the type-A system continuously uses the non-modulation period measuring timer 41 for the communication system determination. During the type-A communication as mentioned above, a change in data from "0" to "1" or from "0" to "1" causes the continuous non-modulation period to be longer than that for the unchanged data. The timer value comparison circuit 46 is supplied with an appropriate determination threshold value. The timer value comparison circuit 46 generates a data reversal control signal 53 when a count value of the non-modulation period measuring timer matches the determination threshold value. The latch circuit 49 latches data "0" in advance because data "0" is initially received from the reader/writer. The toggle circuit 48 as a data reversal circuit receives the data reversal control signal 53. The toggle circuit 48 reverses the most recent decode signal (previous value of the latch circuit 49) received from the latch circuit 49 and transmits the signal to the latch circuit 49. The latch circuit 49 latches the output signal from the toggle circuit 48 in synchronization with the etu clock signal cycle. In this manner, the type-A system can decode reception signals.

When decoding a reception signal, the type-B system continuously uses the non-modulation period measuring timer 41 and the modulation period measuring timer 42 used for the communication type determination. According to the type-B system, as mentioned above, the modulation changes to the demodulation or vice versa when data changes from "0" to "1" or vice versa. The modulation or demodulation remains unchanged when data remains "0" or "1". The timer value comparison circuit 46 is supplied with an appropriate determination threshold value. The data reversal control signal 53 is activated when a measurement value of the non-modulation period measuring timer 41 matches the determination threshold value and the latch circuit 49 contains the most recent decode signal set to "0". The data reversal control signal 53 is also activated when a measurement value of the modulation period measuring timer 42 matches the determination threshold value and the latch circuit 49 contains the most recent decode signal set to "1". The latch circuit 49 latches data "0" in advance because data "0" is initially received from the reader/writer. The toggle circuit 48 receives the data reversal control signal 53. The toggle circuit 48 reverses the most recent decode signal received from the latch circuit 49 and transmits the signal to the latch circuit 49. The latch circuit 49 latches the output signal from the toggle circuit 48 in synchronization with the etu clock signal cycle. In this manner, the type-B system can decode reception signals.

When decoding a reception signal, the high-speed type FLC system continuously uses the non-modulation period measuring timer 41 and the modulation period measuring timer 42 used for the communication type determination. According to the FLC communication system, as mentioned above, a change in data from "0" to "1" or from "1" to "0" causes the modulation period or the non-modulation period to be longer than that for the unchanged data. The timer value comparison circuit 46 is supplied with an appropriate determination threshold value. The data reversal control signal 53 is generated when a measurement value of the non-modulation period measuring timer 41 matches the determination threshold value. The data reversal control signal 53 is also generated when a measurement value of the modulation period measuring timer 42 matches the determination threshold value. The latch circuit 49 latches data "0" in advance because data "0" is initially received from the reader/writer. The toggle circuit 48 receives the data reversal control signal 53. The toggle circuit 48 reverses the most recent decode signal received from the latch circuit 49 and transmits the signal to the latch circuit 49. The latch circuit 49 latches data from the toggle circuit 48 in synchronization with the etu clock signal 54. In this manner, the FLC system can decode reception signals.

The timer value comparison circuit 46 may be supplied with determination threshold values for the type-A, type-B, and FLC systems. The signal 51 from the determination section 45 is used to select the determination threshold value appropriate to the communication system and the transmission rate. An output from the latch circuit 49 is fed back to the timer value comparison circuit 46. The decode section 50 may function as a decoder that can vary the decode system in accordance with a communication system determination result. The single decode function circuit can decode reception data in accordance with multiple communication systems. The type-A or type-B system can set the transmission rate to 212 kbps, 424 kbps, or 847 kbps in accordance with the communication with the reader/writer after the first communication at 106 kbps. When the communication system or the communication rate is known, the CPU 13 provides control to stop operations of the determination section 45, for example. The CPU 13 transmits the communication system or the communication rate to the decode section 50. The timer value comparison circuit 46 is supplied with determination threshold values for 212 kbps, 424 kbps, and 847 kbps corresponding to the type-A and type-B systems. It is also possible to decode reception data at the transmission rates of 212 kbps, 424 kbps, and 847 kbps corresponding to the type-A and type-B systems.

The following describes specific timings of decode operations in accordance with communication system determination results.

Figure 11:
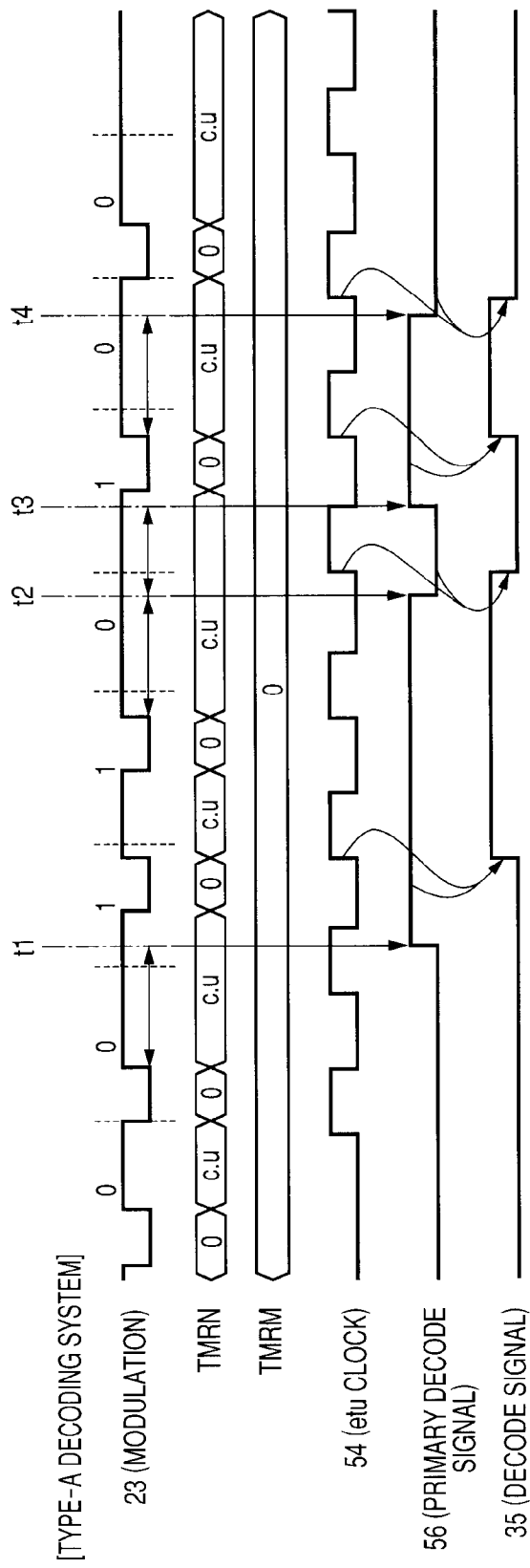
FIG. 11 is a timing chart exemplarily showing a type-A decode operation.

FIG. 11 is a timing chart exemplarily showing a type-A decode operation. During the type-A decode operation, the non-modulation period measuring timer 41 measures the operation clock signal 27 that is equivalent to the carrier extraction clock frequency (13.56 MHz) during an "H" period as the non-modulation period. Initiation of an "L" period as the modulation period zeros the measurement value. FIG. 11 indicates the measurement value (count value) 43 as c.u. The data transmission rate is 106 kbps. The cycle for one bit of data is equivalent to 128 cycles of a carrier. The timer value comparison circuit 46 compares the measurement value with the determination threshold value. An excess of the measurement value c.u over the determination threshold value reverses an output 56 from the toggle circuit 48. The output is synchronized with the etu clock signal and is latched with the latch circuit 49 to generate the decode signal 35. The determination threshold value varies with the most recent decode value. When the previous decode value is "1", the count value reaches 112 to reverse an output from the toggle circuit 48 (t2 and t4). Further, the count value reaches 192 to reverse an output from the toggle circuit 48 (t3). When the previous decode value is "0", the count value reaches 112 to reverse an output from the toggle circuit 48 (t1). The determination threshold value may be determined appropriately in accordance with how an etu duty varies.

Figure 12:
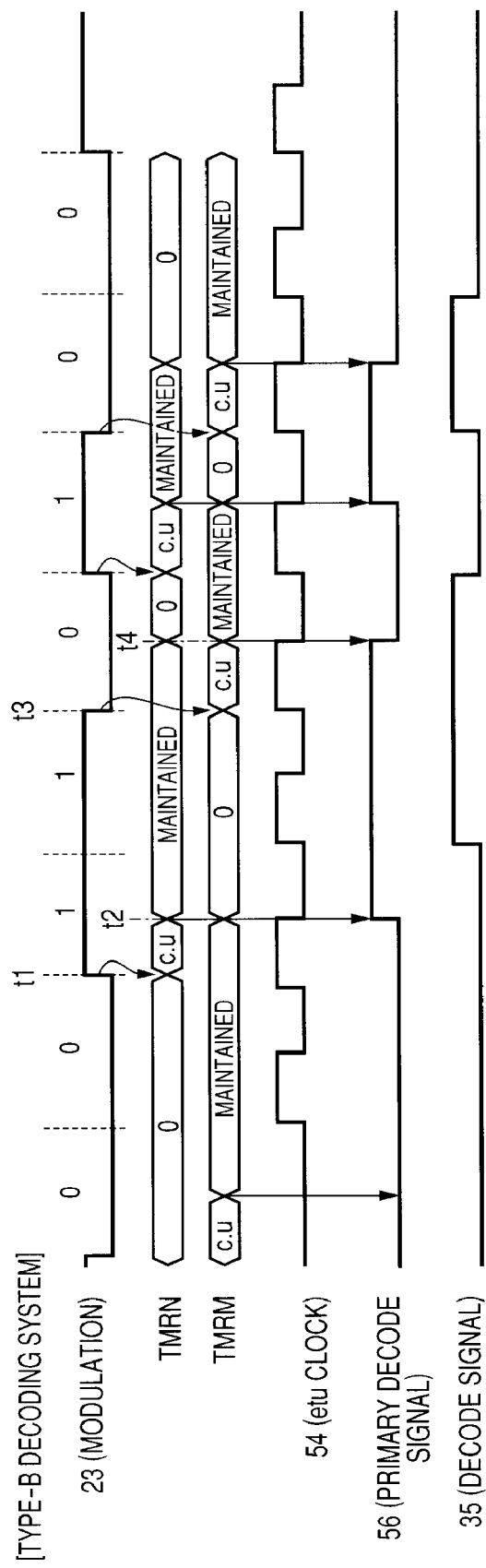
FIG. 12 is a timing chart exemplarily showing a type-B decode operation.

FIG. 12 is a timing chart exemplarily showing a type-B decode operation. During the type-B decode operation, the non-modulation period measuring timer 41 starts counting the operation clock signal 27 in synchronization with initiation of the "H" period as the non-modulation period (t1). The operation clock signal 27 is equivalent to the carrier extraction clock frequency (13.56 MHz). When the measurement value reaches the determination threshold value (t2), the decode operation reverses an output from the toggle circuit 48. In addition, the decode operation stops the measurement operation of the non-modulation period measuring timer 41 and zeros the measurement value of the modulation period measuring timer 42. The modulation period measuring timer 42 starts counting the operation clock signal 27 in synchronization with initiation of the "L" period as the modulation period (t3). The operation clock signal 27 is equivalent to the carrier extraction clock frequency (13.56 MHz). When the measurement value reaches the determination threshold value (t4), the decode operation reverses an output from the toggle circuit 48. In addition, the decode operation stops the measurement operation of the modulation period measuring timer 42 and zeros the measurement value of the non-modulation period measuring timer 41. For example, the determination threshold value 64 may be used for measurement values. The determination threshold value may be determined in accordance with how a duty varies.

Figure 13:
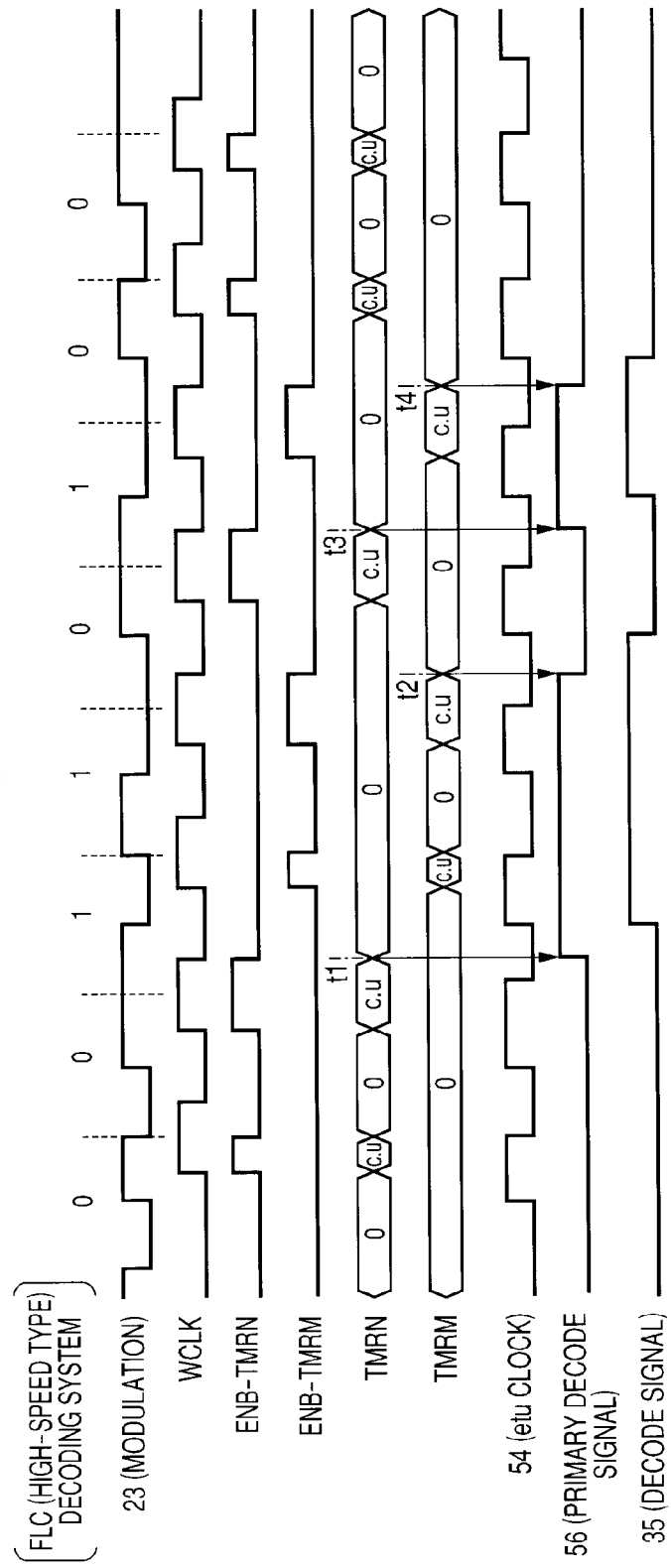
FIG. 13 is a timing chart exemplarily showing a high-speed type (FLC) decode operation.

FIG. 13 is a timing chart exemplarily showing a high-speed type (FLC) decode operation. The high-speed type decode operation controls count operations of the measuring timers 42 and 41 using timer enable signals ENB-TMRM and ENB-TMRN generated by the timer value comparison circuit 46. A window clock WCLK is used to generate the timer enable signals ENB-TMRM and ENB-TMRN. For example, the data transmission rate is set to 212 kbps. The cycle for one bit of data is equivalent to 64 cycles of a carrier. In this case, the window clock WCLK is assumed to be a signal that is delayed a quarter cycle from the etu clock signal 54. The timer enable signal ENB-TMRN during the non-modulation period is assumed to be an AND signal between the window clock WCLK and the demodulation signal 23 when "0" is detected as the most recent decode value to be fed back from the latch circuit 49. The timer enable signal ENB-TMRN goes low when "1" is detected as the most recent decode value to be fed back. The timer enable signal ENB-TMRM during the modulation period is assumed to be an AND signal between the window clock WCLK and the demodulation signal 23 when "1" is detected as the most recent decode value to be fed back from the latch circuit 49. The timer enable signal ENB-TMRM goes low when "0" is detected as the most recent decode value to be fed back. The non-modulation period measuring timer 41 performs a measurement operation when the timer enable signal ENB-TMRN is set to "H". The modulation period measuring timer 42 performs a measurement operation when the timer enable signal ENB-TMRM is set to "H". When the measurement value 43 or 44 exceeds the determination threshold value, the timer value comparison circuit 46 reverses an output from the toggle circuit 48 (t1, t2, t3, t4). The determination threshold value 32 may be used for measurement values because the window clock WCLK is used. The window clock WCLK provides a countermeasure against duty variations.

The above-mentioned reception logic circuit 30 does not need a decoder specific to each code type. It is possible to reduce the scale of the circuit for determining and decoding code types of reception signals that are coded with different code types. This is preferable for devices such as an IC card that needs to be miniaturized.

Figure 14:
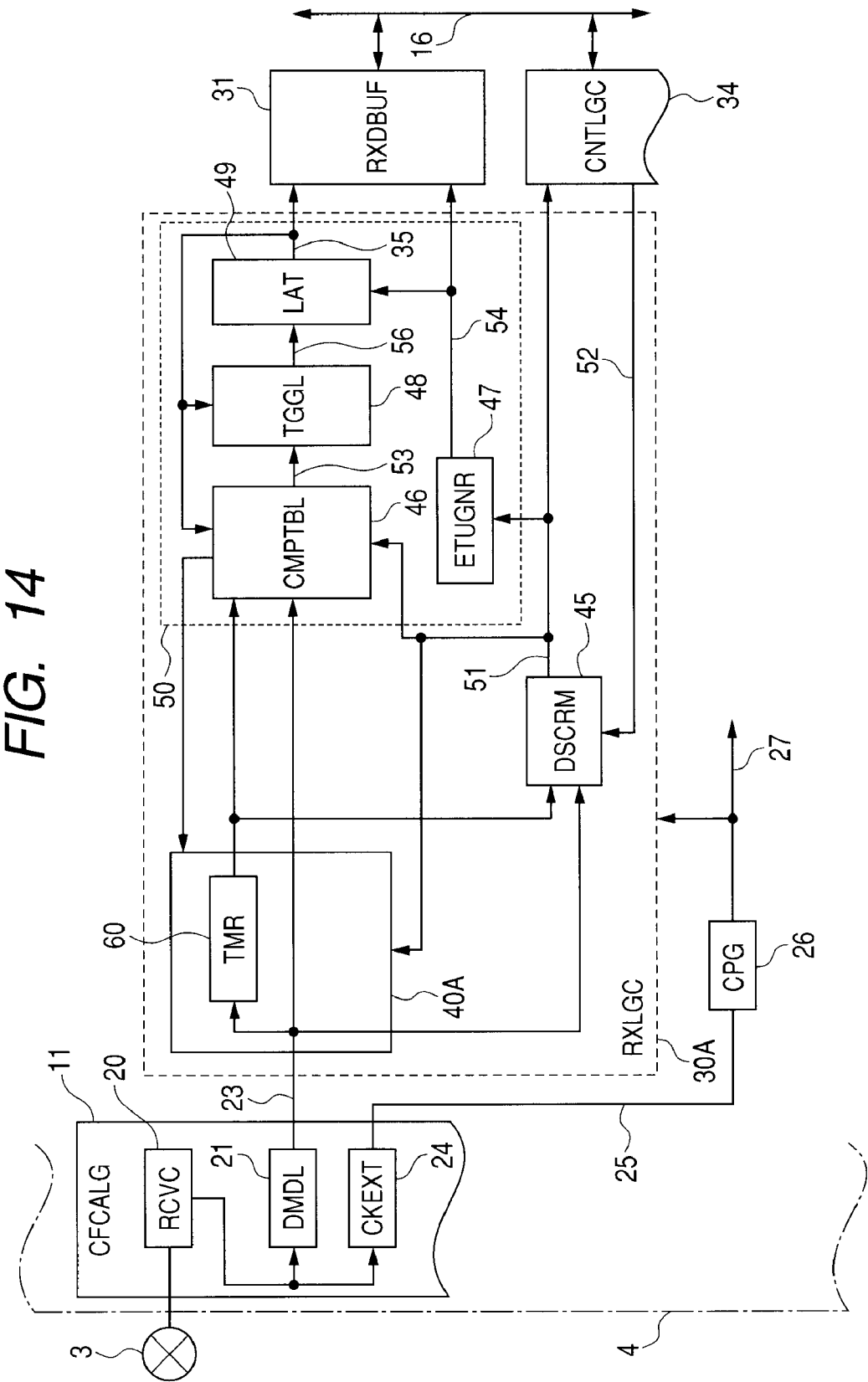
FIG. 14 is a block diagram showing another example of the reception logic circuit.

FIG. 14 shows another example of the reception logic circuit. A reception logic circuit 30A in FIG. 14 differs from the equivalent in FIG. 1 as follows. A period measuring timer (TMR) 60 is used as the non-modulation period measuring timer and the modulation period measuring timer. A reception signal demodulated by the demodulation circuit 21 is supplied to the determination section 45 and the timer value comparison circuit 46. In this example, the period measuring timer 60 measures a non-modulation period and a modulation period as needed on a time-shared basis. The determination section 45 and the timer value comparison circuit 46 can determine whether a measurement value output from a timer 40A corresponds to the non-modulation period or the modulation period. Again, a reception signal demodulated by the demodulation circuit 21 is supplied to the determination section 45 and the timer value comparison circuit 46. It is possible to reduce the number of components for providing the function equivalent to that shown in FIG. 1.

Figure 15:
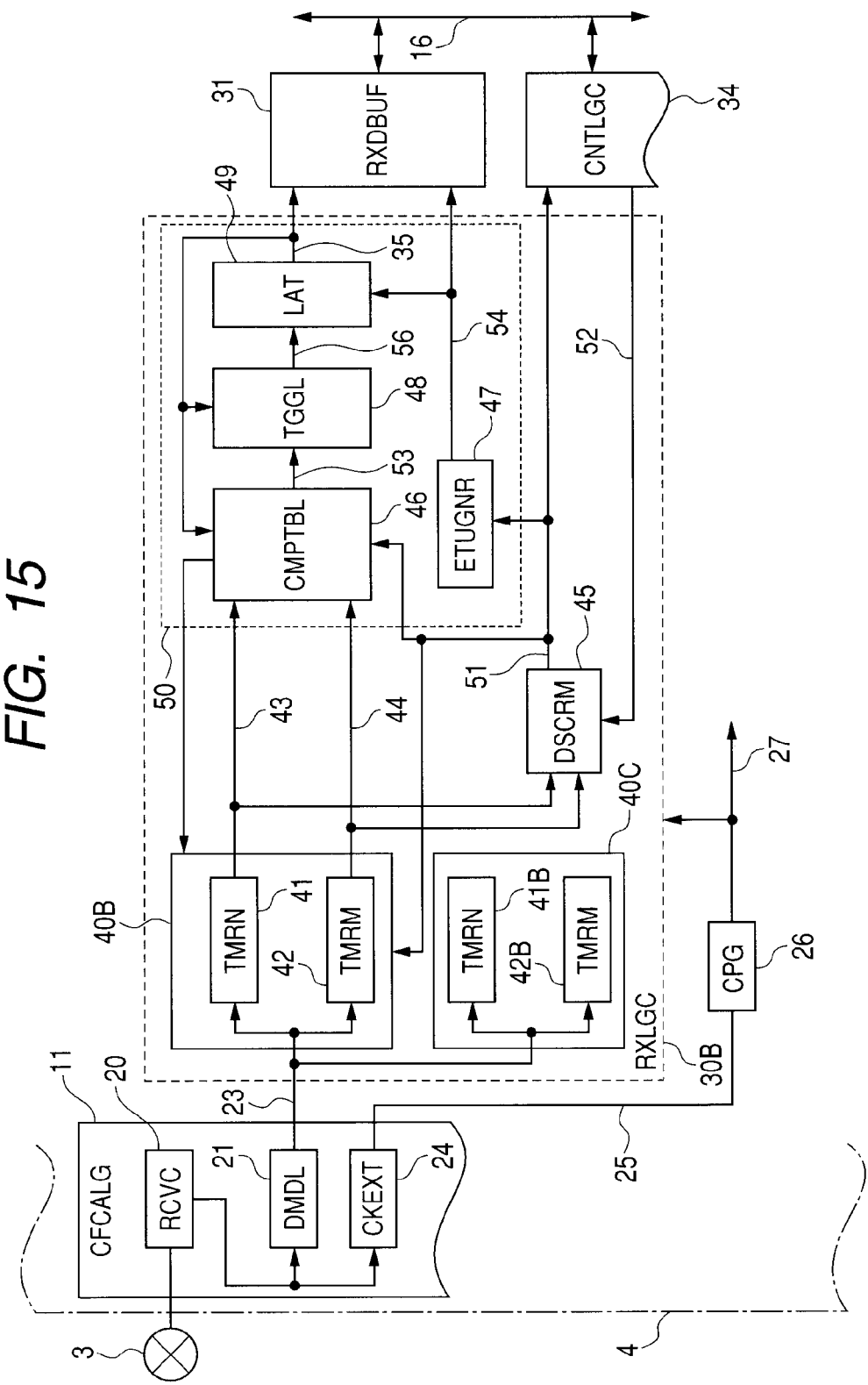
FIG. 15 is a block diagram showing yet another example of the reception logic circuit.

FIG. 15 is a block diagram showing yet another example of the reception logic circuit. A reception logic circuit 30B in FIG. 15 includes a non-modulation period measuring timer and a modulation period measuring timer independently for data decoding and communication system determination. A non-modulation period measuring timer 41B and a modulation period measuring timer 42B of a timer 40C are newly added and are specialized for the communication system determination. The timers are capable of settling count-up intervals and timings independently for data decoding and communication system determination. The design can be facilitated.

Figure 16:
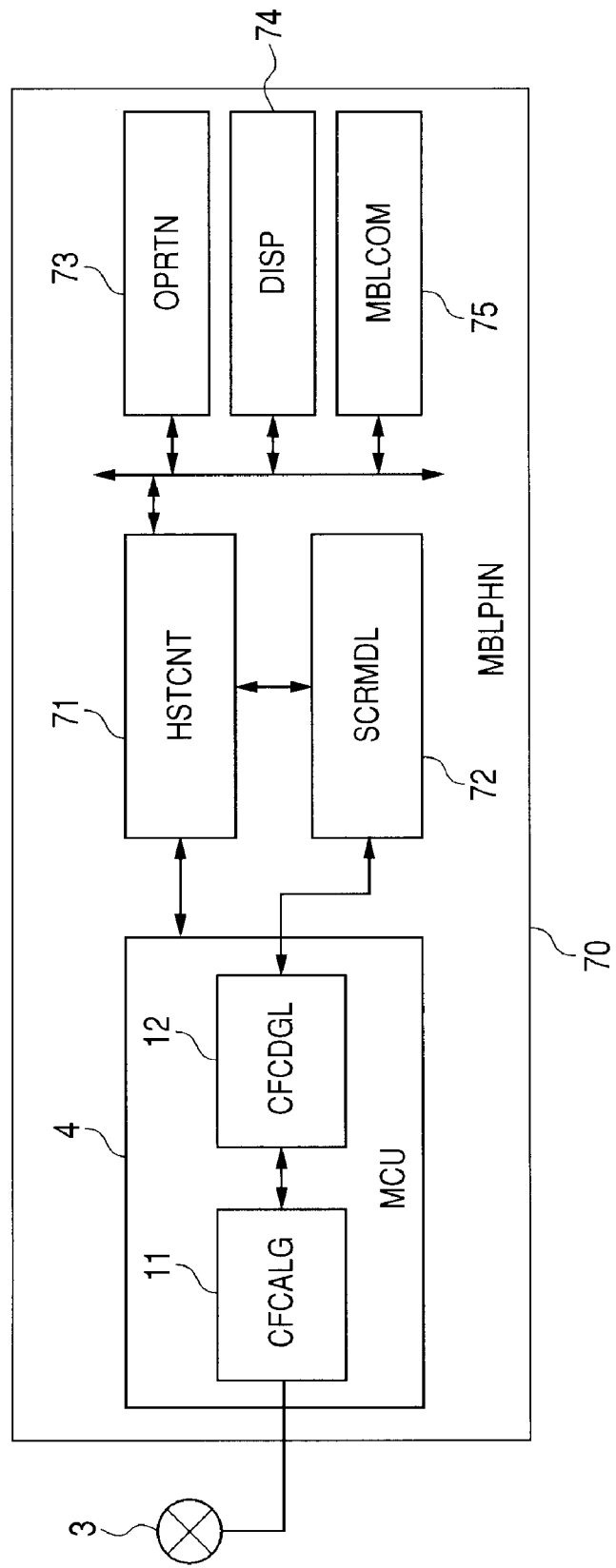
FIG. 16 is a simplified block diagram exemplarily showing a case where the invention is applied to a mobile telephone provided with the NFC system.

FIG. 16 exemplarily shows a case where the invention is applied to a mobile telephone (MBLPHN) 70 provided with the NFC system. The reference symbol CFCDGL generically signifies the digital circuitry except the non-contact communication analog section 11 in the microcomputer 4 in FIG. 2. The mobile telephone is mounted with the microcomputer (MCU) 4 used for the IC card in FIG. 2. The microcomputer 4 is coupled to a host controller (HSTCNT) 71 and a secure module (SCRMDL) 72. The host controller (HSTCNT) 71 is coupled to an operation section (OPRTN) 73, a display section (DSP) 74, and a mobile communication section (MBLCOM) 75. The secure module 72 is used for authentication processes, for example. The host controller 71 provides overall control. This example can miniaturize additional circuits when the mobile telephone 70 is mounted with the same interface function as the non-contact IC card.

While there have been described specific preferred embodiments of the present invention, it is to be distinctly understood that the present invention is not limited thereto but may be otherwise variously embodied within the spirit and scope of the invention.

For example, the code types are not limited to those described above. The modulation systems used for communication are not limited to ASK (Amplitude Shift Keying) and may include PSK (Phase Shift Keying), QAM (Quadrature Amplitude Modulation), and the like. The present invention may be widely applied to not only IC cards and mobile telephones but also the other mobile terminals.

What is claimed is:

1. A semiconductor device comprising:
a demodulation circuit for demodulating a modulated signal that is coded with a specified code type and is received at an antenna; and
a reception logic circuit for decoding a demodulation signal that is output from the demodulation circuit,
wherein the reception logic circuit determines one of a plurality of code types for the demodulation signal and decodes the demodulation signal in accordance with a determined code type to reproduce reception data,
wherein the code type is determined based on a
difference between codes appearing in the demodulation signal
during one of a modulation period and a non-modulation period, and
wherein the demodulation signal is decoded in
accordance with a determined code type based on a state of one of the modulation period and the non-modulation period alternately appearing in the demodulation signal,
wherein the reception logic circuit comprises:
a timer that measures one of the modulation period and the non-modulation period appearing in the demodulation signal;

a determination section that determines the code type based on a measurement value measured by the timer; and a decode section that uses a result measured by the timer in accordance with the determined code type, decodes the demodulation signal, and reproduces reception data, wherein the code types mainly comprise Modified Miller, Non-Return to Zero (NRZ), and Manchester codes, wherein the determination section determines a NRZ code when the timer detects that the measurement value for the non-modulation period has exceeded a value equivalent to half an encode time unit for each of Modified Miller and NRZ codes during the modulation period in the demodulation signal, wherein the determination section determines a Modified Miller code when the demodulation signal enters the non-modulation period before exceeding the value equivalent to half the encode time unit and the measurement value for the non-modulation period is detected to exceed the value equivalent to half the encode time unit during the non-modulation period, and wherein the determination section determines a Manchester code when the demodulation signal reenters the modulation period before the measurement value for the non-modulation period exceeds the value equivalent to half the encode time unit.

2. The semiconductor device according to claim 1, wherein the Manchester code comprises a plurality of code types corresponding to different data transmission rates, and wherein, when determining the Manchester code, the determination section determines a transmission rate difference in the Manchester code in accordance with an increase in the measurement value for the modulation period.

3. The semiconductor device according to claim 1, wherein the timer measures each non-modulation period when the Modified Miller code is determined as the code type, and wherein, when the Modified Miller code is determined as the code type, the decode section reverses a logical value whenever the timer measurement value exceeds a threshold value and synchronizes a reverse timing with the encode time unit to generate a decode signal.

4. The semiconductor device according to claim 3, wherein the threshold value is equivalent to a period exceeding half the encode time unit.

5. The semiconductor device according to claim 1, wherein, when the NRZ code is determined as the code type, the timer repeatedly measures a period equivalent to 1/n of the encode time unit from initiation of the non-modulation period and measures a period equivalent to 1/n of the encode time unit from initiation of the modulation period, wherein n is a counter value , and wherein, when the NRZ code is determined as the code type, the decode section reverses a logical value whenever the timer measurement value exceeds a threshold value and synchronizes a reverse timing with the encode time unit to generate a decode signal.

6. The semiconductor device according to claim 5, wherein the threshold value is equivalent to a period half the encode time unit.

7. The semiconductor device according to claim 1, wherein, when a Manchester code is determined as the code type, the timer measures a period overlapping with the non-modulation period and a period overlapping with the modulation period for each specified period before and after a boundary for the encode time unit; and wherein, when the Manchester code is determined as the code type, the decode section reverses a logical value whenever the timer measurement value exceeds a threshold value and synchronizes a reverse timing with the encode time unit to generate a decode signal.

8. The semiconductor device according to claim 7, wherein the specified period before and after a boundary for the encode time unit comprises a period equivalent to a quarter of the encode time unit before and after the encode time unit.

9. The semiconductor device according to claim 1, wherein the timer measures the modulation period and the non-modulation period by counting a clock signal synchronized with a carrier extraction clock signal extracted from a modulated signal.

10. A semiconductor device comprising:

a demodulation circuit for demodulating a modulated signal that is coded with a specified code type and is received at an antenna;

a reception logic circuit for decoding a demodulation signal that is output from the demodulation circuit;

a reception data buffer that temporarily stores reception data output from the reception logic circuit;

a transmission data buffer that temporarily stores transmission data;

a transmission logic circuit that encodes transmission data output from the transmission data buffer in accordance with the code type determined by the reception logic circuit;

a modulation circuit that modulates a carrier into a data signal based on an encoding signal generated by the transmission logic circuit; and a central processing unit that controls operations of the reception logic circuit and the transmission logic circuit and provides access control for the reception data buffer and the transmission data buffer, wherein the reception logic circuit determines one of a plurality of code types for the demodulation signal and decodes the demodulation signal in accordance with a determined code type to reproduce reception data, wherein the code type is determined based on a difference between codes appearing in the demodulation signal during one of a modulation period and a non-modulation period, wherein the demodulation signal is decoded in accordance with the determined code type based on a state of one of the modulation period and the non-modulation period alternately appearing in the demodulation signal, wherein the reception logic determines a Non-Return to Zero (NRZ) code when a timer detects that the measurement value for the non-modulation period has exceeded a value equivalent to half an encode time unit for each of Modified and NRZ codes during the modulation period in the demodulation signal, wherein the reception logic determines a Modified Miller code when the demodulation signal enters the non-modulation period before exceeding the value equivalent to half the encode time unit and the measurement value for the non-modulation period is detected to exceed the value equivalent to half the encode time unit during the non-modulation period, and wherein the reception logic determines a Manchester code when the demodulation signal reenters the modulation period before the measurement value for the non-modulation period exceeds the value equivalent to half the encode time unit.

11. The semiconductor device according to claim 10,
wherein the timer measures the modulation period and the non-modulation period by counting a clock signal synchronized with a carrier extraction clock signal extracted from a modulated signal.

12. A communication device for communication based on electromagnetic induction using a carrier, comprising:
a data processing device, wherein the data processing device comprises
a demodulation circuit for demodulating a modulated signal that is coded with a specified code type and is received at an antenna; and
a reception logic circuit for decoding a demodulation signal that is output from the demodulation circuit,
wherein the reception logic circuit determines one of a plurality of code types for the demodulation signal and decodes the demodulation signal in accordance with a determined code type to reproduce reception data,
wherein the code type is determined based on a difference between codes appearing in the demodulation signal during one of a modulation period and a non-modulation period,
wherein the demodulation signal is decoded in accordance with the determined code type based on a state of one of the modulation period and the non-modulation period alternately appearing in the demodulation signal,
wherein the reception logic circuit comprises:
a timer that measures one of the modulation period and the non-modulation period appearing in the demodulation signal;
a determination section that determines the code
type based on a measurement value measured by the timer; and
a decode section that decodes the demodulation signal in accordance with the determined code type and reproduces reception data,
wherein the determination section determines a Non-Return to Zero (NRZ) code when the timer detects that the measurement value for the non-modulation period has exceeded a value equivalent to half an encode time unit for each of Modified Miller and NRZ codes during the modulation period in the demodulation signal,
wherein the determination section determines a Modified Miller code when the demodulation signal enters the non-modulation period before exceeding the value equivalent to half the encode time unit and the measurement value for the non-modulation period is detected to exceed the value equivalent to half the encode time unit during the non-modulation period, and
wherein the determination section determines a Manchester code when the demodulation signal reenters the modulation period before the measurement value for the non-modulation period exceeds the value equivalent to half the encode time unit.

13. The communication device according to claim 12,
wherein the timer measures the modulation period and
the non-modulation period by counting a clock signal synchronized with a carrier extraction clock signal extracted from a modulated signal.

* * * * *